2 Sheets—Sheet 1.

A. SCOTLAND & J. M. SIMPSON.
Apparatus for Removing and Collecting Bugs from Vines, &c.

No. 197,903. Patented Dec. 4, 1877

Witnesses:
James Martin Jr.
D. P. Cone

Inventor:
Andrew Scotland
John M. Simpson
by
Mason, Fenwick & Lawrence

2 Sheets—Sheet 2.
A. SCOTLAND & J. M. SIMPSON.
Apparatus for Removing and Collecting Bugs from Vines, &c.
No. 197,903. Patented Dec. 4, 1877.
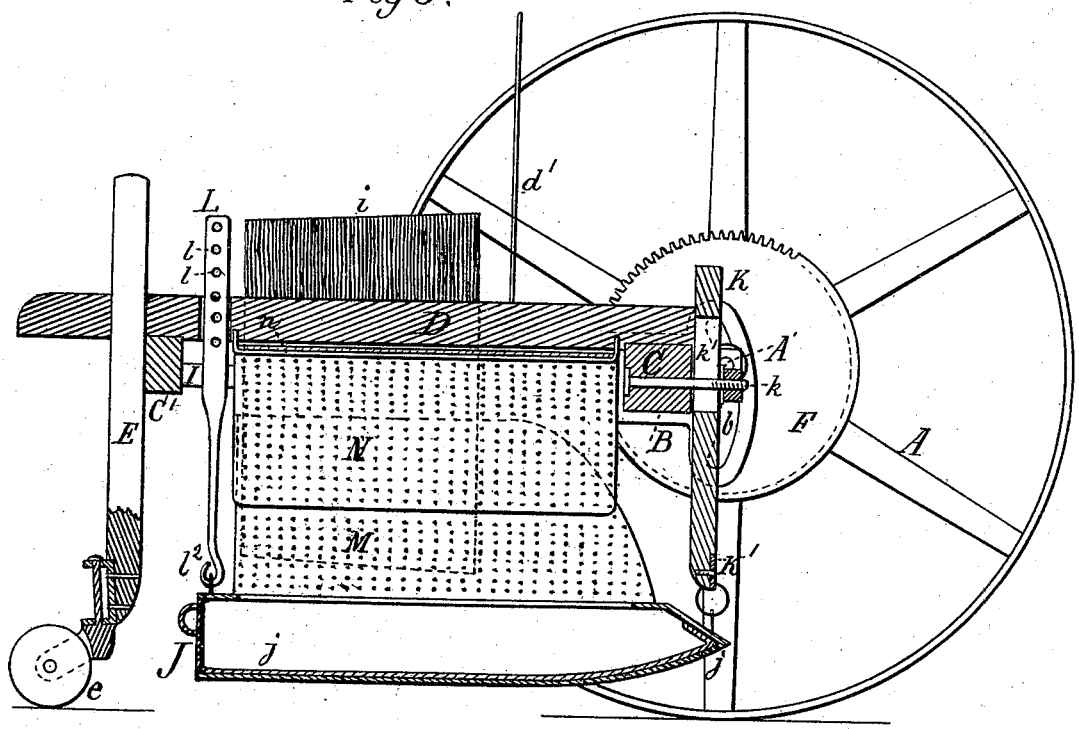
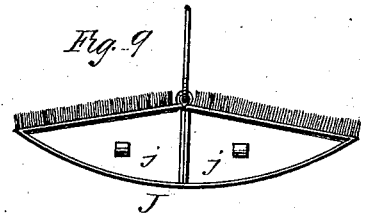
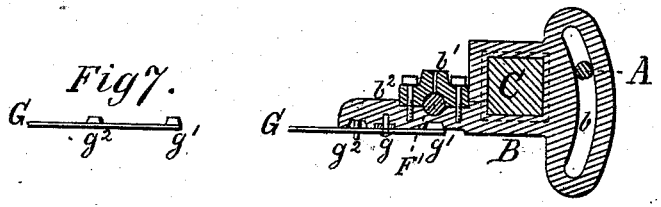
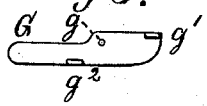
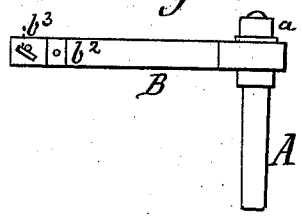
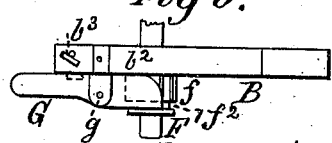
Witnesses:
James Martin Jr.
D. P. Corre
Inventor:
Andrew Scotland
John M. Simpson
by
Mason, Fenwick & Lawrence
N. PETERS, PHOTO-LITHOGRAPHER, WASHINGTON, D.C.

UNITED STATES PATENT OFFICE.

ANDREW SCOTLAND AND JOHN M. SIMPSON, OF MALTAVILLE, NEW YORK.

IMPROVEMENT IN APPARATUS FOR REMOVING AND COLLECTING BUGS FROM VINES, &c.

Specification forming part of Letters Patent No. 197,903, dated December 4, 1877; application filed September 8, 1877.

*To all whom it may concern:*

Be it known that we, ANDREW SCOTLAND and JOHN M. SIMPSON, of Maltaville, in the county of Saratoga and State of New York, have invented a new and useful Machine for Removing Bugs, Slugs, and Worms from Potato and other Vines, and collecting the same, which invention is fully set forth in the following specification and accompanying drawings, in which latter—

Figure 1:
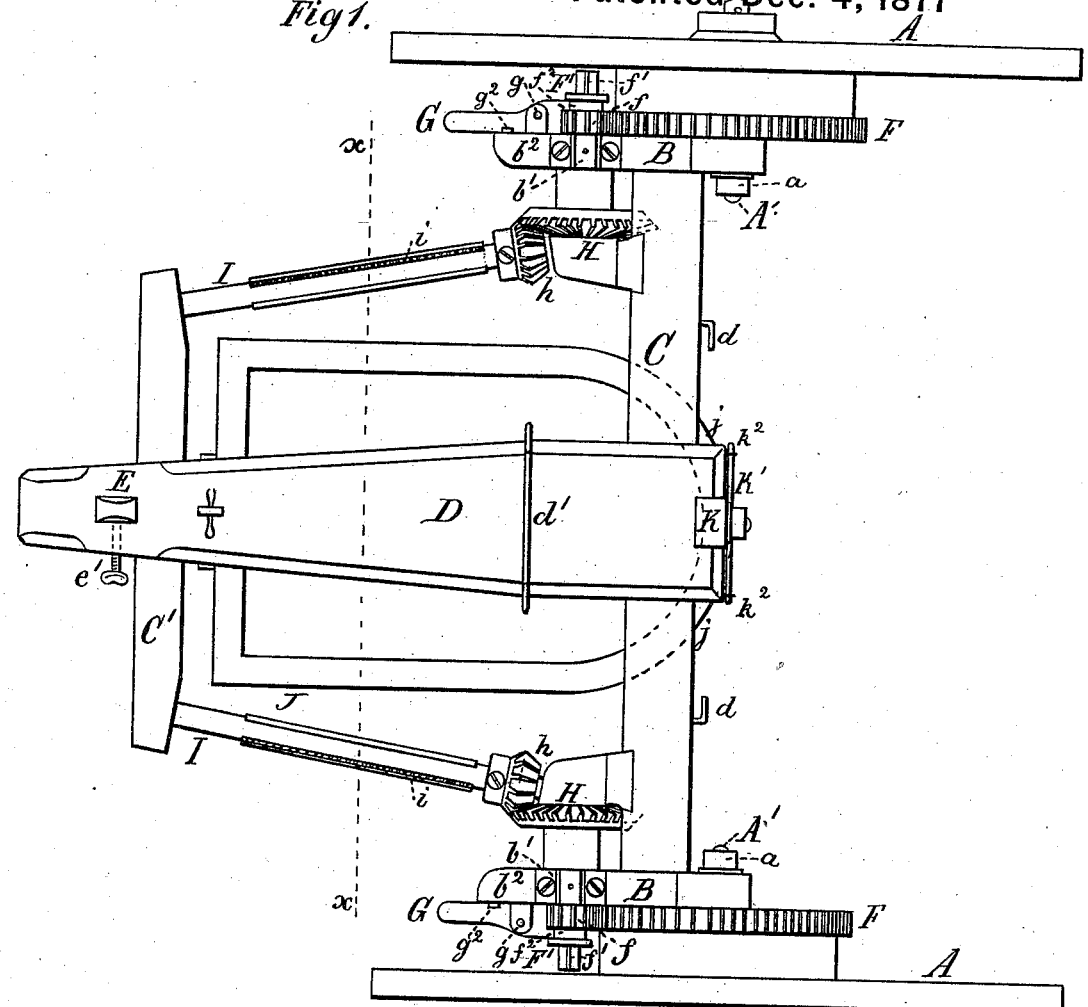
Figure 2:
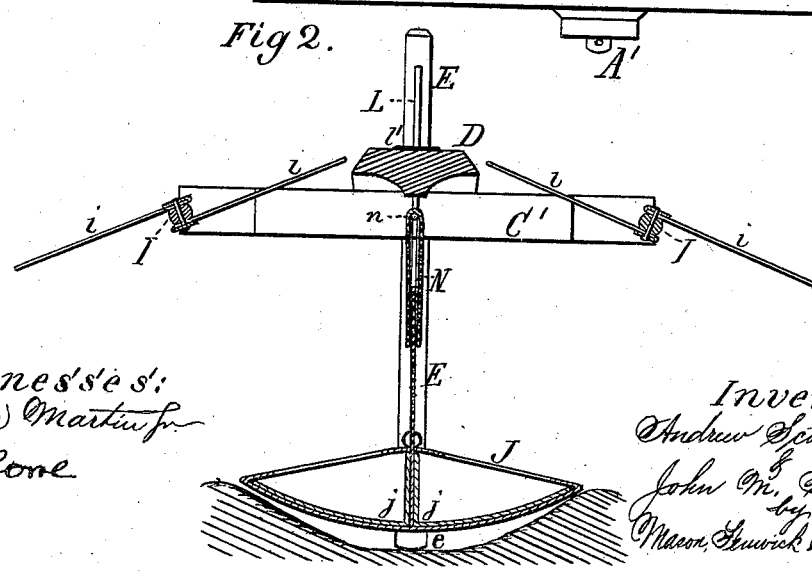

Figure 1 is a representation, in plan view, of our machine. Fig. 2 is a vertical cross-section of the same in the line $x$ $x$ of Fig. 1. Fig. 3 is a vertical longitudinal section of the same. Fig. 4 is a detail view of the adjusting axle attachments. Fig. 5 is a bottom view of the same. Fig. 6 is a detail view of the starting and stopping mechanism of the revolving beaters or brushes. Fig. 7 is a side elevation of a hand-lever used in operating the said mechanism. Fig. 8 is a top view of the same.

The nature of our invention consists in certain constructions, combinations, and arrangements of parts, hereinafter fully described and specifically claimed, whereby a machine is produced which serves to sweep all kinds of small vermin from potato-vines, and to collect them in a suitable receptacle, with drawers or other means of access, and from which the operator can remove the vermin at will, for the purpose of destroying them.

In the drawings, A A represent the wheels of the machine, and A' the axles, which are fastened, by means of nuts $a$, in curved slots $b$ of two caps, B, attached to the ends of a cross-beam, C, by means of square openings $c$.

To the cross-beam C a center beam, D, is attached, the rear end of which is supported by a vertically-adjustable post, E, with a caster-wheel, $e$, at its foot. The post E is fitted loosely into the beam D, so that it may slide up and down therein, and a set-screw, $e'$, in the beam D serves to impinge on the post E and prevent it from sliding accidentally.

The wheels A are provided with concentric driving-gears F, which gear into pinions $f$ on shafts F'. The shafts F' are supported by bearings $b^1$, provided on rear extensions $b^2$ of the cap B.

The slots $b$ are made concentric to the shaft F', in order to keep the wheels F and $f$ in gear, whatever change is made in the position of the axles A' in the slots $b$.

The pinions $f$ are capable of longitudinal movement upon the shafts F', for the purpose of throwing them in and out of gear with wheels F. This movement is secured by means of straight keys $f^1$, grooved hubs $f^2$, and spring-levers G. The levers G are pivoted at $g$ to the extensions $b^2$, and are provided with lips $g^1$ $g^2$. The lips $g^1$ remain in the grooves of the hubs $f^2$, and serve to operate the pinions $f$, as above stated, while the lips $g^2$ serve to maintain the lever G in its two main positions—to wit, by bearing against the sides of the extensions $b^2$, and thereby keeping the pinions $f$ in gear with the wheels F, and by entering the recesses $b^3$ at the lower side of the extensions $b^2$, and thereby keeping the pinions $f$ out of gear with the wheels F.

The shafts F' are also provided with bevel-gears H, which serve to drive other bevel-gears, $h$, on two nearly-horizontal shafts, I. The shafts I are provided with suitable bearings in the beam C, and in another cross-beam, C', fastened to the center beam D near its rear end. These shafts I have attached or formed on them brushes $i$, made of broom-corn or other yielding material which does not injure the vines when passing over them.

The shafts I and brushes $i$ are so arranged that they converge toward the rear of the machine at any suitable angle, and incline upward from the rear to the front, and thus operate upon the vines across the whole width of the furrows, sweeping from the outer margin to the center of the furrow of vines, and lifting the bugs, worms, or slugs from the vines, and throwing them toward the center of the machine.

The shafts I are adjusted vertically, as occasion requires, by means of the post E and set-screw $e'$, axles A', nuts $a$, and the slots $b$. Between the shafts I a pan, J, is suspended upon bars K and L. The bar K is fastened to the beam C by a screw-bolt, $k$, and a slot, $k^1$, and is thus adjustable vertically; and the rod L is hung upon a spring-pin, $l^1$, passed through one of a number of holes, $l$, in this bar, resting on the top of the center beam D. Vertical adjustment of this bar L is effected by inserting the pin $l^1$ in a lower or higher hole, $l$. The adjustment of the pan J vertically is made independent of the vertical adjustment of the revolving brushes $i$, in order to compensate for any unequal height of the ground and the vines in the different rows of a field. The bar K has at its lower end a cross-head, K', with two arms, $k^2$, to which the front part of the pan J is fastened loosely, so as to be capable of rolling to a limited extent. The bar L terminates at its lower end with a hook, $l^2$, to which the rear part of the pan J is hung loosely, so as to be capable of rolling in a vertical plane so long as not restrained by the connections at $k^2$. The connections at $k^2$ and $l^1$ permit the pan to swing longitudinally. The pan J is provided in the middle with a longitudinal vertical partition, M, which extends above its top, the extended portion being perforated, as seen in Fig. 3. The middle part of the pan J is the highest, and its top is beveled down on both sides to the bottom, while the bottom itself is curved to correspond with the formation of the valley of the furrows between which it moves.

In order to make allowance for slight movements of the pan while the machine is in operation, and to have an uninterrupted partition between the beam D and pan J at all times, a double perforated metal screen, N, is suspended on a rod, $n$, below the center beam D, so that the partition M has sufficient play between it laterally and vertically, while the screen N is free to swing on its rod. The front part $j$ of the pan J is rounded and beveled off, so as to enable it to easily glide over small obstacles in its way, and also to avoid hooking into the vines and injuring them. On each side of the partition M the pan J is provided with a drawer, $j'$, in which the vermin are collected.

The beam D is provided with suitable means, as at $d$, to which the thills for a horse are to be attached. A rack, $d'$, is attached to the beam D, for the purpose of holding the reins of the team out of the way of the machinery below.

The distance between the wheels A is equal to that between the valleys of two furrows, and the brushes $i$ are situated above the ridges or centers of the furrows.

A seat for the driver may be provided in rear of the rein-rack, or in any suitable place upon the machine.

In Fig. 9 of the drawings we have shown the upper edge of the back end of the collecting-pan J provided with a fringe of broom-corn, hair, bristles, or other yielding material, for cleansing the underneath portion of the vines when thrown back by the revolving brushes I during the operation of the machine.

Operation: The revolving brushes $i$ are adjusted in respect to the vines of the furrows, as before described. The pan J is adjusted as low as practicable to the ground, and the machine is started with its wheels A A in the valleys of the furrows. As the wheels A revolve they cause the brushes $i$ to revolve at a proper speed. The vines of both furrows between the wheels are partly laid over by the brushes, and rapidly but gently swept and cleaned of the thereto-adhering vermin. As the vines are laid over they present to the brushes the under sides of the leaves, which are always infested with the destroying bugs, worms, or slugs. The vermin are thrown by the brushes either into the drawers $j$ of the pan J, or against the partitions M N, from whence they fall into the pan below. The draft created by the revolving brushes $i$ prevents flying insects from flying off from the perforated partition, the apertures of which insure a circulation of the air, and prevent its rebounding in a manner which would facilitate the escape of the vermin.

In cleaning adjoining rows of the potato-field, one of the rows previously swept by the brushes has its vines turned over to the other side and cleaned.

The drawers $j'$ are from time to time removed, and the contents emptied into a place provided for the destruction of the vermin.

With this invention the vines are rapidly and thoroughly cleansed without apparent injury to their further growth, and with a machine of moderate size we have been enabled to clean from twelve to sixteen acres per day.

Having described our invention, what we claim as new, and desire to secure by Letters Patent, is—

1. The vertically-adjustable pan J, as described, having the partition M, in combination with the yielding partition N and brushes I, substantially as described.

2. The combination of a perforated partition for the passage of air and for deflecting the insects, the suspended pan J, vibrating in a longitudinal and transverse direction when in use, and revolving brushes $i$, inclined upward and converged toward the back of the machine, and the gearing for operating the brushes, substantially as and for the purpose described.

3. The combination of the yielding partition N, having a fixed fulcrum, $n$, and the movable partition M of the pan J, whereby the pan is permitted to sway and to be vertically adjusted, substantially as set forth.

4. The flexible perforated central screens or partitions M N, for the passage of air, whereby the vermin are prevented from being thrown beyond the pan J, substantially as set forth.

5. The combination of the revolving brushes $i$, gears F $f$ and H $h$, adjustable axles A', and the caps B, having slots $b$ concentric to the bearings $b^1$, substantially as and for the purpose described.

6. The axles A' in slots $b$, in combination with the vertically-adjustable wheeled carriage, consisting of the frame C C' D, the sliding post E, having a wheel, $e$, and a set-screw, $e'$, and the wheels A, whereby the revolving brushes *i* are adjusted and operated, substantially as set forth.

7. The cap B, having a curved slot, *b*, an extension, $b^2$, with a bearing-box, $b^1$, and a square opening, *c*, whereby it is attached to the beam C, substantially as set forth.

8. In a machine for collecting bugs, slugs, &c., from potato-vines, the combination of the axles A', fitted in slots *b*, wheels A, spur and bevel gears F *f*, and pinions H *h*, with their shafts and revolving brushes *i*, substantially as and for the purpose described.

Witness our hands in the matter of our application for a patent for a machine for removing and collecting bugs, &c., from potato-vines, this 3d day of September, 1877.

ANDREW SCOTLAND.
    JOHN M. SIMPSON.

Witnesses:
 H. C. SWIFT,
 S. W. PEARSE.